(12) United States Patent
Tao

(10) Patent No.: US 9,986,618 B2
(45) Date of Patent: May 29, 2018

(54) LED TUBE LAMP

(71) Applicant: PHILIPS LIGHTING HOLDING B.V., Eindhoven (NL)

(72) Inventor: Haimin Tao, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days. days.

(21) Appl. No.: 15/558,417

(22) PCT Filed: Mar. 1, 2016

(86) PCT No.: PCT/EP2016/054273
§ 371 (c)(1),
(2) Date: Sep. 14, 2017

(87) PCT Pub. No.: WO2016/146372
PCT Pub. Date: Sep. 22, 2016

(65) Prior Publication Data
US 2018/0063906 A1    Mar. 1, 2018

(30) Foreign Application Priority Data

Mar. 17, 2015  (EP) .................................. 15159412

(51) Int. Cl.
*H05B 33/00* (2006.01)
*H05B 33/08* (2006.01)
*F21Y 103/10* (2016.01)
*F21Y 115/10* (2016.01)
*F21K 9/278* (2016.01)

(52) U.S. Cl.
CPC ....... *H05B 33/089* (2013.01); *H05B 33/0809* (2013.01); *F21K 9/278* (2016.08); *F21Y 2103/10* (2016.08); *F21Y 2115/10* (2016.08)

(58) Field of Classification Search
None
See application file for complete search history.

(56) References Cited

U.S. PATENT DOCUMENTS

2016/0363308 A1* 12/2016 Shum ...................... F21K 9/238
2017/0311396 A1* 10/2017 Sadwick .............. H05B 33/089

* cited by examiner

*Primary Examiner* — Monica C King

(57) ABSTRACT

The invention describes an LED tube lamp (1) realized for use with a high-frequency switched ballast (2, 3), which LED tube lamp (1) comprises an LED arrangement (100); a driver (10) realized to drive the LED arrangement (100); a detuning arrangement (11) comprising a detuning circuit (12) and a configuring circuit (110, 111) realized to determine whether the high-frequency ballast (2, 3) is an IC-controlled type (2) or a self-oscillating type (3) and to configure the detuning circuit (12) accordingly wherein configuring the detuning circuit (12) to reduce the lamp current when determining the high-frequency switched ballast (2, 3) is the self-oscillating type (3). The invention further describes the detuning arrangement (11) for an LED tube lamp (1); and a method of operating an LED tube lamp (1) with a high-frequency switched ballast (2, 3).

13 Claims, 7 Drawing Sheets

LED TUBE LAMP

CROSS-REFERENCE TO PRIOR APPLICATIONS

This application is the U.S. National Phase application under 35 U.S.C. § 371 of International Application No. PCT/EP2016/054273, filed on Mar. 1, 2016 which claims the benefit of European Patent Application No. 15159412.4, filed on Mar. 17, 2015. These applications are hereby incorporated by reference herein.

FIELD OF THE INVENTION

The invention describes an LED tube lamp; a detuning arrangement and a method of operating an LED tube lamp.

BACKGROUND OF THE INVENTION

Tube lamps have been preferred over incandescent lamps on account of their efficiency. A tube lamp such as a fluorescent tube lamp operates from a ballast, which regulates the current through the lamp. LED lamps are even more efficient than fluorescent lamps, and retrofit LED tube lamps have been developed. A retrofit LED tube lamp can be inserted into the housing of a fluorescent tube lamp fixture. Since the ballast is incorporated in the lighting fixture, the LED tube lamp must be able to operate from the "legacy" ballast. EP2793276A1 discloses the inductance of a variable inductance unit in the LED tube lamp is adjusted to make the magnitude of the current flowing through the LED unit be stabilized so as to fall within the predetermined range. US20140225519A1 discloses a detection circuit that detects the operating frequency of the ballast so as to differentiate electronic ballast or inductive ballast, and a LC arrangement is configured according to the detected operating frequency.

There are many different high-frequency ballasts. One widely used design is the half-bridge LC resonant circuit. The control circuit of such a ballast is usually one of two major types: self-oscillating using a ring core, or IC-controlled. The self-oscillating circuit is generally a "low-end" and economical solution, while the IC-controlled circuit is "high-end" and generally more expensive.

However, the different control circuits described above are characterised by difference responses when an LED tube lamp is connected to the ballast. In the case of an IC-controlled ballast, which has a good current source characteristic, the ballast output current or "lamp current" does not vary much when LED tube is connected. However a self-oscillating ballast has a soft current source characteristic, with the result that the ballast output current increases when an LED tube is inserted into the lighting fixture. This increased current causes severe reliability problems for the self-oscillating ballast due to overheating of the ballast internal circuit components. In some cases, a self-oscillating ballast can fail shortly after the LED tube lamp is inserted and switched on.

However, a customer wishing to replace a fluorescent tube lamp by a corresponding LED tube lamp may not be aware of this issue, and may not be able to determine whether his lighting fixtures will operate reliably with the known types of LED tube lamp available on the market. Since self-oscillating ballasts are widely used in certain regions such as the APR (Asia Pacific Region) market and part of the EMEA (Europe, Middle East and Africa) market, problems with compatibility are to be expected for the existing LED tube lamps.

Therefore, it is an object of the invention to provide an improved LED tube lamp that avoids the problems mentioned above.

SUMMARY OF THE INVENTION

It would be advantageous to have an LED tube lamp that is universally compatible with both the IC-controlled ballast and the self-oscillating ballast.

The object of the invention is achieved by the LED tube lamp of claim 12; by the detuning arrangement of claim 1; and by the method of operating an LED tube lamp. A basic idea of embodiments of the invention is first distinguishing which type the ballast is, and then reducing the lamp current when the ballast is self-oscillating ballast, since self-oscillating ballast may result overcurrent but IC-controlled ballast not.

According to the invention, a detuning arrangement for an LED tube lamp is realized for use with a high-frequency switched ballast, and comprises a detuning circuit realized for arrangement between a driver of the LED tube lamp and a high-frequency switched ballast; and a configuring circuit realized to determine, during operation of the LED tube lamp, whether the high-frequency ballast is an IC-controlled type or a self-oscillating type and to configure the detuning circuit accordingly wherein configuring the detuning circuit to reduce the lamp current when determining the high-frequency switched ballast is the self-oscillating type.

According to the invention, the LED tube lamp is realized for use with a high-frequency switched ballast and comprises an LED arrangement; a driver realized to drive the LED arrangement; and a detuning arrangement as discussed above.

An advantage of the LED tube lamp according to the invention is that it can detect whether it is connected to a low-end self-oscillating ballast or to a high-end IC-controlled ballast, and the detuning circuit or detuning circuit can be adjusted accordingly without any effort required on the part of a user. The effect of the automatic configuration is to achieve a lamp current level that is similar or lower than a the lamp current of a comparable fluorescent tube lamp, thereby extending the compatibility of the LED tube lamp and prolonging the lifetime of a self-oscillating ballast.

An advantage of the detuning arrangement according to the invention is that an easy and economical means is provided for adapting an LED tube lamp to two different kinds of ballast such that the LED tube lamp can be operated reliably with either kind.

According to the invention, the method of operating an LED tube lamp comprises the steps of connecting an LED tube lamp according to the invention into a tube lamp arrangement comprising a high-frequency switched ballast; providing power to the LED tube lamp via the high-frequency switched ballast; sensing a lamp current to determine whether the high-frequency switched ballast is of an IC-controlled type or a self-oscillating type and configuring the detuning circuit of the detuning arrangement of the LED tube lamp accordingly, i.e. on the basis of the detected ballast wherein configuring the detuning circuit to reduce the lamp current when determining the high-frequency switched ballast is the self-oscillating type.

The dependent claims and the following description disclose particularly advantageous embodiments and features of the invention. Features of the embodiments may be combined as appropriate. Features described in the context of one claim category can apply equally to another claim category.

In the following, without restricting the invention in any way, it may be assumed that the LED tube lamp or TLED is realized as a retrofit tube lamp. Such a TLED can be used to replace an existing fluorescent tube lamp, and comprises an LED load, an internal LED driver, a filament emulation circuit, a pin safety circuit, etc., arranged in a lamp housing which has the same dimensions and connecting interfaces as the fluorescent lamp type which it will replace. The LED tube lamp according to the invention can be realized to replace any of the usual fluorescent tube lamps, for example the LED tube lamp can be realized as a linear tube lamp or as a compact fluorescent lamp (CFL) in which the tube is shaped with a number of turns. The terms "LED tube lamp" and "TLED" may be used interchangeably in the following. It may be assumed that the internal LED driver comprises a half-bridge circuit that periodically shunts the input current to the half-bridge at a certain duty cycle so that the LED current can be controlled to a desired level. The LED driver can also be built from a switched-mode driver, for example, on the basis of a boost, a buck, or a buck-boost circuit.

A detuning circuit can improve the compatibility between the ballast and the driver. Therefore, in a preferred embodiment of the invention, the detuning circuit is arranged at the input to the driver. Effectively, the detuning circuit is connected between the pins (and any filament emulation circuits) of the tube lamp and the driver input. By connecting the detuning circuit between the pins of the tube lamp, it is possible to measure the ballast output current, also referred to as the lamp current.

The detuning circuit can be realized in any suitable way. For example, any suitable combination of inductors and capacitors can serve as a detuning circuit. In a particularly preferred embodiment of the invention, the detuning circuit comprises a series inductor and a parallel capacitor. Such a C-L detuning circuit is suitable for use with a high-end IC-controlled ballast, since it acts to maintain the lamp current at a level similar to that of a fluorescent tube lamp. This means that the ballast will operate essentially as intended, as though it were driving a fluorescent lamp.

However, a C-L detuning circuit is not particularly suitable for a ballast with self-oscillating control, since the lamp current will be significantly higher on account of the soft current source characteristics as described above. Therefore, in a preferred embodiment of the invention, the configuring circuit comprises a current detection circuit realized to detect a lamp current exceeding a predefined threshold. In this way, a self-oscillating ballast can reliably be detected by measurement of the lamp current.

The configuring circuit can respond in any suitable way in order to adapt the detuning circuit to the ballast. For example, the configuring circuit can be realized to automatically connect a suitable selection of detuning circuit components to arrive at a desired combination. In a preferred embodiment of the invention, the configuring circuit comprises a switch realized to "switch out" or remove at least one element of the detuning circuit when the lamp current exceeds the predefined threshold. In a preferred embodiment of the invention, when the detuning circuit comprises a series inductor and a parallel capacitor, the configuring circuit is realized to switch out or remove the capacitor from the detuning circuit. In other words, when the lamp is powered from a high-end IC-controlled ballast, the lamp current is relatively small and the switch remains closed. However, when the lamp is connected to a low-end self-oscillating ballast, the lamp current is significantly higher and the switch is opened. In experiments and tests leading up to the invention, it was observed that a series-inductor or series-L detuning circuit can significantly reduce the lamp current to a level even below that of a conventional tube lamp. Therefore, by simply providing such a detuning arrangement, the LED tube lamp according to the invention is compatible with both low-end and high-end ballasts. Furthermore, the series-L detuning circuit remaining after the automatic configuration ensures that a self-oscillating ballast can operate reliably, and is significantly less likely to fail.

A high lamp current—indicative of a self-oscillating ballast at the inputs—can be detected in any suitable way. For example, when the detuning circuit comprises a series inductor at an input to the LED driver, the lamp current might be determined by measuring a voltage drop over the series inductor. Another approach can involve using a series inductor with a secondary winding, and measuring the voltage across the secondary winding. An alternative, more complex approach might be to detect the presence of a self-oscillating ballast using the knowledge that the operating frequency of a self-oscillating ballast usually drops when an LED tube lamp is connected. In a preferred embodiment of the invention, however, the current detection circuit comprises a power resistor arranged in the path of the lamp current, and the switch comprises a thermal fuse thermally coupled to the power resistor. Furthermore, the thermal fuse is connected in series with the detuning capacitor. When the lamp is connected to a self-oscillating ballast, the high lamp current passing through the power resistor causes its temperature to rapidly increase. The hot power resistor, thermally coupled to the fuse, causes the fuse to blow on reaching a trip temperature. This in turn switches out the capacitor of the detuning circuit, so that only the series-inductor remains. In this way, the detuning circuit is automatically configured to the type of ballast of the lighting fixture. This "circuit alteration" will not happen when the lamp is connected to an IC-controlled ballast since the lamp current through the power resistor is too low to "blow" the thermal fuse. In this way, the LED tube lamp according to the invention adapts itself to the type of ballast to which it is connected. Preferably, the current detection circuit is realized to detect a lamp current exceeding 150% of the target fluorescent lamp current. To this end, the value of the power resistor and the trip temperature of the thermal fuse can be chosen accordingly.

In the case of a one-shot thermal fuse, the parallel capacitor will be permanently switched out once the lamp has been inserted into a tube lighting fixture that uses a self-oscillating ballast, and switched on. In order to avoid a situation in which the altered lamp is removed and inserted into a tube lighting fixture that uses a different type of ballast, thereby possible leading to problems, in a preferred embodiment of the invention the LED tube lamp comprises a visible indication of the fuse status. For example, a visible indicator might show whether the fuse is intact (the retrofit lamp can still be used with both types of ballast) or blown (the retrofit lamp can be used only with a self-oscillating ballast type).

Alternatively, in a preferred embodiment of the invention, the switch comprises a resettable thermal fuse. This type of fuse can be returned to its original state, for example by pressing a button on the fuse. With such a resettable thermal fuse, the lamp can automatically adapt to a self-oscillating ballast, but a user can "re-configure" it if necessary for operation with an IC-controlled ballast. In a further alternative embodiment, the function of a thermal fuse can be realized using a PTC (Positive Temperature Coefficient) resistor, whose resistance increases with increasing temperature. If the lamp current is high on account of a self-oscillating ballast at the inputs, the temperature of the PTC resistor will increase, and its resistance will therefore also increase significantly, for example by a factor of 1,000. Such a PTC resistor will automatically reset to its original low-ohmic state when the lamp is switched off.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
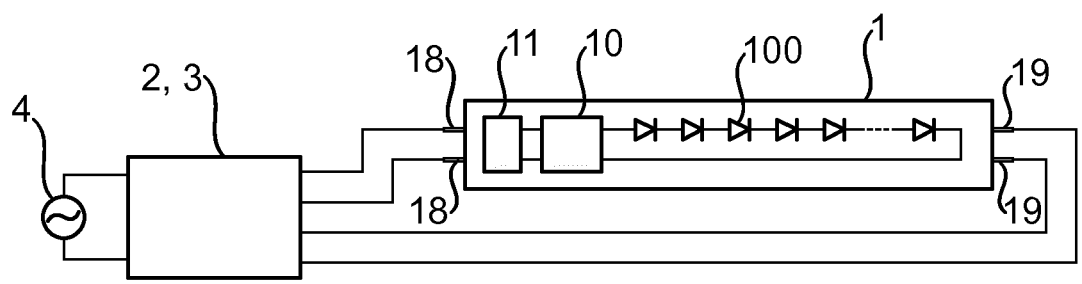
FIG. 1 shows a block diagram of an embodiment of an LED tube lamp arrangement according to the invention.

FIG. 1 shows a block diagram of an embodiment of a tube lamp arrangement according to the invention. A TLED 1 according to the invention is connected to a HF ballast 2, 3, which in turn is connected to a mains power supply 4. The legacy ballast 2, 3 is designed to provide current to a fluorescent lamp. The ballast can be a high-end IC controlled ballast 2, or a low-end self-oscillating ballast 3. The TLED 1 comprises an LED arrangement 100 connected across the outputs of an LED driver 10, and a detuning arrangement 11 that detects the ballast type and adapts a detuning circuit if the detected ballast type is a self-oscillating ballast 3. In this way, the detuning arrangement 11 can protect the low-end ballast 3 from damage, thereby prolonging the lifetime of the tube lamp arrangement. The manner of operation of the detuning arrangement will be explained in more detail below.

Figure 2:
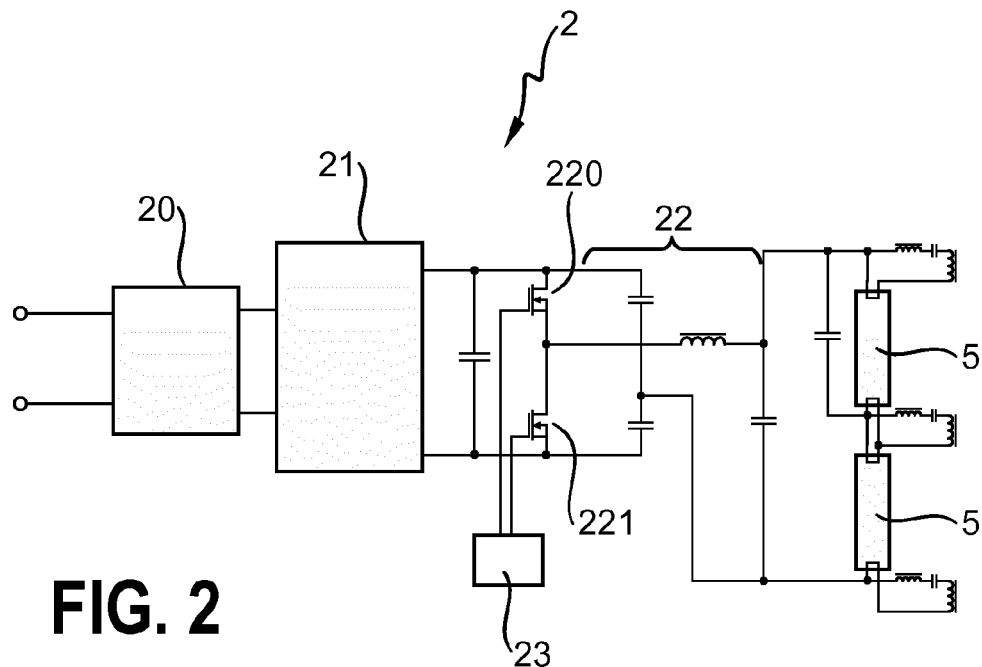
FIG. 2 shows a schematic diagram of a tube lamp arrangement based on an IC-controlled ballast.

FIG. 2 shows a schematic diagram of a tube lamp arrangement based on a high-end HF IC-controlled "warm-start" ballast 2 with filament preheating. Here, in an exemplary arrangement, a number of tube lamps 5 are series-connected across the outputs of the high-end HF ballast 2. The lamps 5 are typically arranged in a housing (not shown) with sockets for the pins at the outer ends of each lamp. A lamp 5 can be a fluorescent tube lamp or a TLED. The ballast 2 in this case is a constant current ballast 2, and comprises an EMI filter 20 and a power factor correction unit 21. A half-bridge LC resonant circuit 22 is arranged at the output stage of the ballast 2 and is controlled by an IC controller 23, which can use one or more ICs to control the high-frequency switching behaviour of a pair of FETs 220, 221. For this type of ballast 2, the lamp current (measured between each end of a lamp 5) is relatively low.

Figure 3:
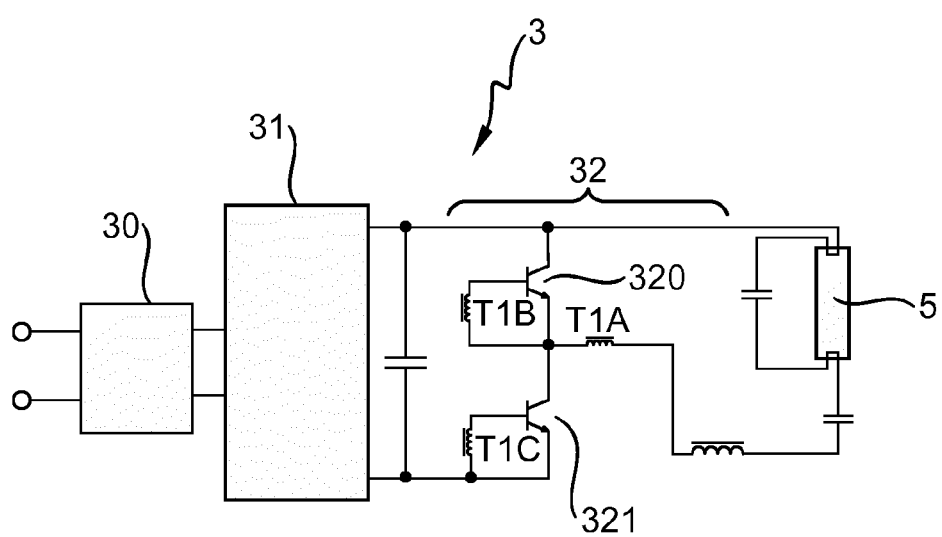
FIG. 3 shows a schematic diagram of a tube lamp arrangement based on a self-oscillating ballast.

FIG. 3 shows a schematic diagram of a tube lamp arrangement based on a low-end HF self-oscillating "cold-start" ballast 3. Here, in this exemplary arrangement, a single tube lamp 5 is connected across the outputs of the self-oscillating ballast 3. Again, the lamp 5 can be a fluorescent tube lamp or a TLED. The ballast 3 in this case comprises an EMI filter 30, a passive power factor correction unit 31, and a self-oscillating half-bridge circuit 32 comprising transistors 320, 321 are driven by a ring core comprising three windings T1A, T1B, T1C. Once triggered, the circuit oscillates by itself. The operating frequency of the half-bridge is determined by a combination of many factors like the LC tank resonant frequency, the transistor storage time, primary and secondary turns ratio of the ring core, etc. For this type of ballast 2, the lamp current (measured between each end of the lamp 5) is relatively high.

Figure 4:
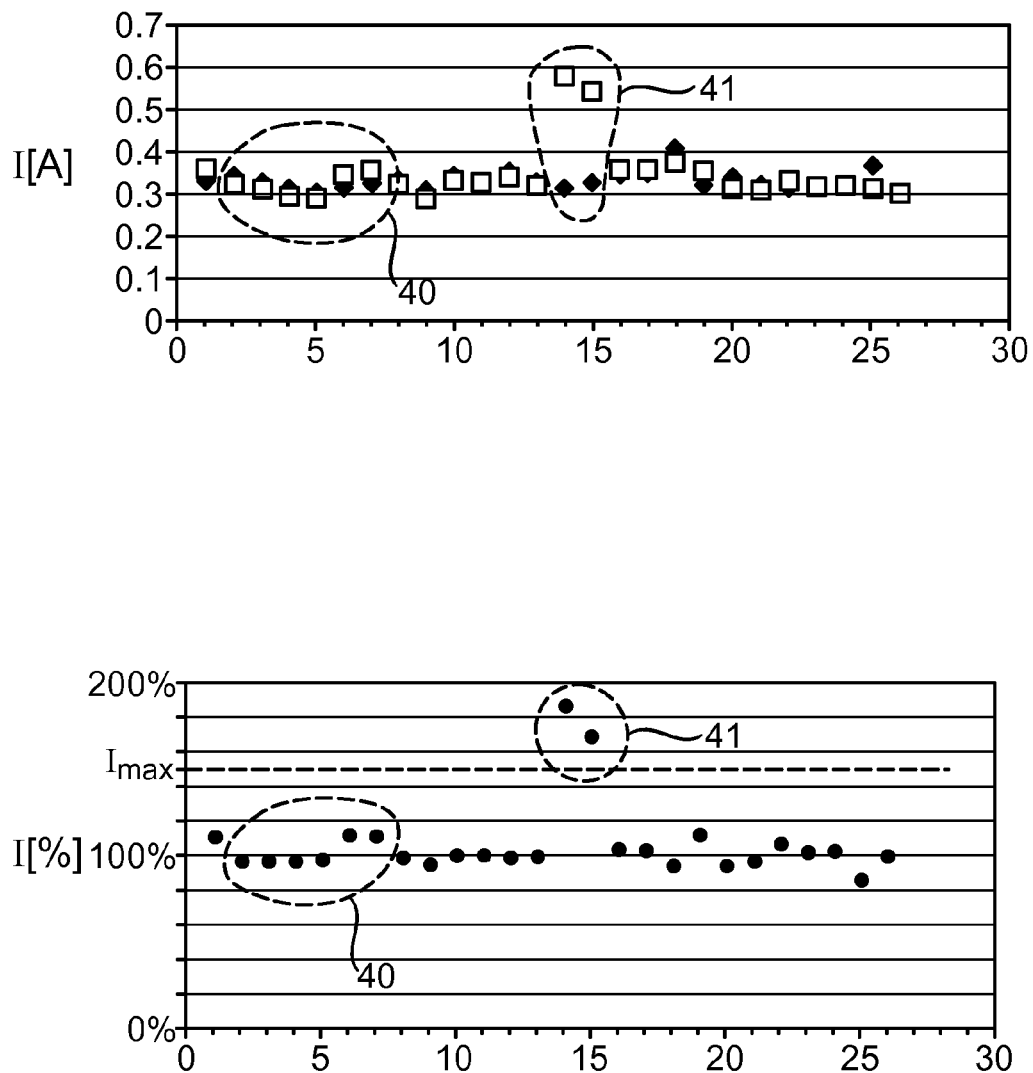
FIG. 4 shows a plot of lamp current for a fluorescent tube lamp and a prior art TLED.

FIG. 4 shows two plots of tube lamp current (Y-axis, in Amps) against ballast for a variety of high-end and low-end ballasts (X-axis). The upper plot in the diagram shows value pairs for lamp current (in Amps) for various fluorescent tube lamp (diamond symbols) and lamp current (square symbols) for equivalent prior art TLEDs. Each value pair was measured for one of various types of lamp ballast. For a high-end ballast, the lamp current is similar for both types of lamp, as indicated by the exemplary group 40 of value pairs. However, for a low-end ballast of the self-oscillating type, the lamp current measured across the TLED is significantly higher than the lamp current measured across the fluorescent tube lamp, as indicated by the group 41 of value pairs. The higher lamp current can damage the self-oscillating ballast. For this reason, some TLED lamps are declared incompatible with self-oscillating ballasts. The lower plot in the diagram shows the lamp current of each TLED as a percentage of the lamp current (Y-axis) of its equivalent fluorescent tube lamp for the same selection of ballasts. This plot shows that the lamp current of the TLEDs is comparable to the lamp current of the equivalent fluorescent tube lamps for the high-end ballast types, as indicated by the exemplary group 40 of values, for which the TLED lamp current reaches a value of close to 100% of the fluorescent tube lamp current. However, for the low-end self-oscillating ballast types, the TLED lamp current is significantly greater than the fluorescent tube lamp current, exceeding 150%, as indicated by the group 41. To avoid damage to a self-oscillating ballast on account of such an undesirably high lamp current, the circuit according to the invention automatically configures the detuning circuit when the lamp current exceeds a threshold $I_{max}$. The diagram shows an exemplary value of 150% for such a threshold current $I_{max}$ that would be appropriate for a TLED according to the invention operating with any of those self-oscillating ballasts.

Figure 5:
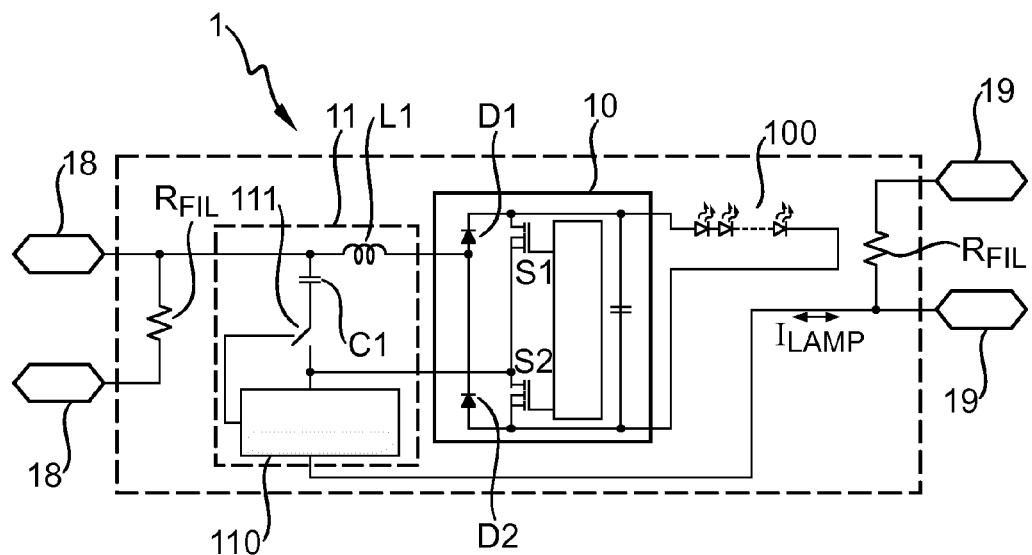
FIG. 5 shows a first embodiment of an LED tube lamp according to the invention.
Figure 7:
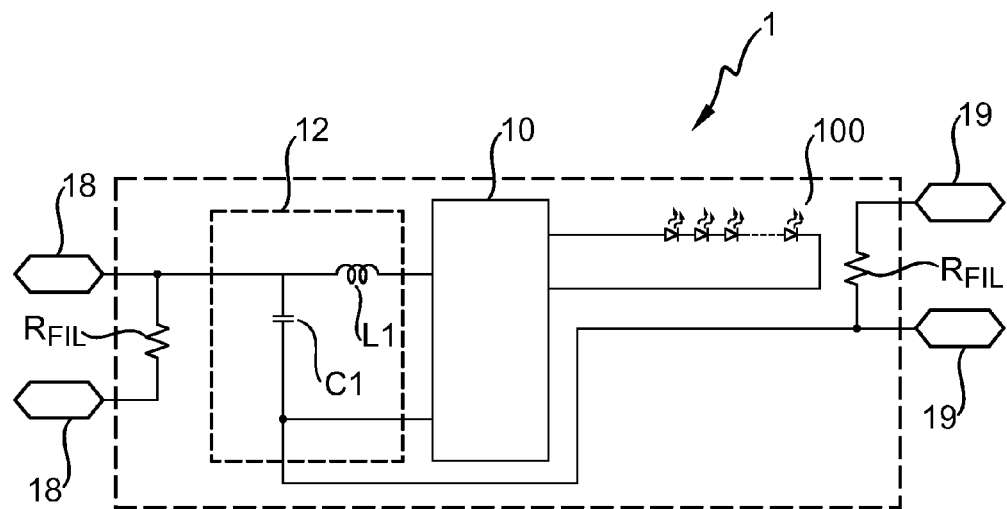
FIG. 7 shows the LED tube lamp of FIG. 5 when connected to an IC-controlled ballast.
Figure 8:
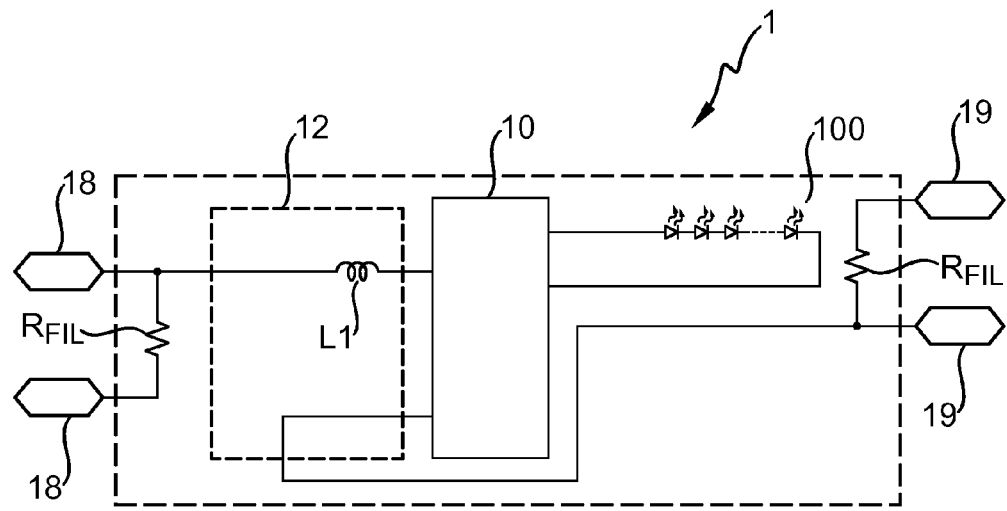
FIG. 8 shows the LED tube lamp of FIG. 5 when connected to a self-oscillating ballast.

FIG. 5 shows an embodiment of the LED tube lamp 1 according to the invention. The diagram shows filament emulation circuits $R_{FIL}$ at the pins 18, 19. The LED driver 10 is shown to comprise a controller and half-bridge shunt switch arrangement D1, D2, S1, S2 for converting a high-frequency AC power from a HF ballast to a suitable DC power for driving the LED arrangement 100. The half-bridge shunt switch D1, D2, S1, S2 periodically shunts the input current at the half-bridge at a certain duty cycle so that the LED current can be controlled to a desired level. The LED driver 10 can also be built from a switched-mode driver, for example using a boost, a buck, or a buck-boost driver topology. In order to be able to use the TLED 1 with any HF ballast whether high-end or low-end the detuning arrangement 11 comprises a current detection circuit 110 and a switch 111. In this embodiment, the detuning arrangement comprises a series inductor L1 and a parallel capacitor C1 which can operate as a detuning circuit in one of two modes, depending on the position of the switch 111. When the TLED 1 is connected to a high-end ballast, the lamp current $I_{LAMP}$ remains below a certain threshold, and the current detection circuit 110 keeps the switch 111 closed, so that the resulting detuning circuit 12 will comprise both capacitor C1 and inductor L1. An equivalent circuit for this situation is shown in FIG. 7. However, when the TLED 1 is connected to a low-end ballast, a higher ballast output current $I_{LAMP}$ or lamp current $I_{LAMP}$ will be detected by the current detection circuit 110, which then opens the switch 111 so that the capacitor C1 is effectively switched out. In this case, the resulting detuning circuit 12 comprises only the series inductor L1. An equivalent circuit for this situation is shown in FIG. 8.

Figure 6:
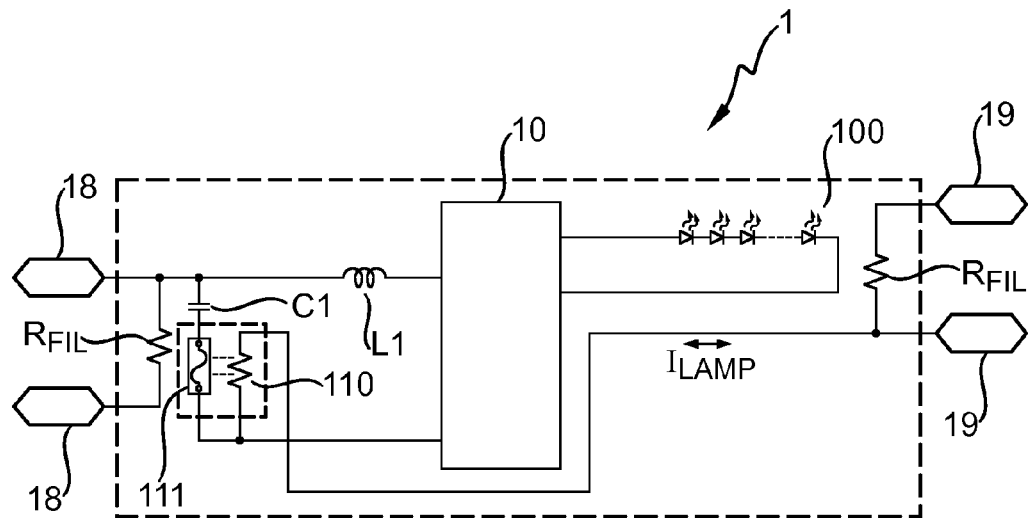
FIG. 6 shows a realization of the LED tube lamp of FIG. 5.

FIG. 6 shows a realization of the LED tube lamp 1 of FIG. 5. Here, the detuning arrangement is shown to comprise a power resistor 110 and a thermal fuse 111. The lamp current threshold can be set by appropriate choice of resistor 110, which preferably has a value of only a few Ohm. The resistor and fuse are thermally coupled to each other. When the TLED 1 is connected to a self-oscillating ballast, the lamp current $I_{LAMP}$ is higher, and a significant amount of heat will be generated by the resistor. As a result, the resistor temperature increases rapidly and will eventually reach a level that causes the thermal fuse to blow. This blown fuse switches out the capacitor C1. When the lamp is connected to an IC-controlled HF ballast, the ballast output current $I_{LAMP}$ or lamp current $I_{LAMP}$ through the power resistor R is lower, so that the fuse will not blow. In this way the TLED 1 adapts itself to the type of ballast to which it is connected.

Figure 9:
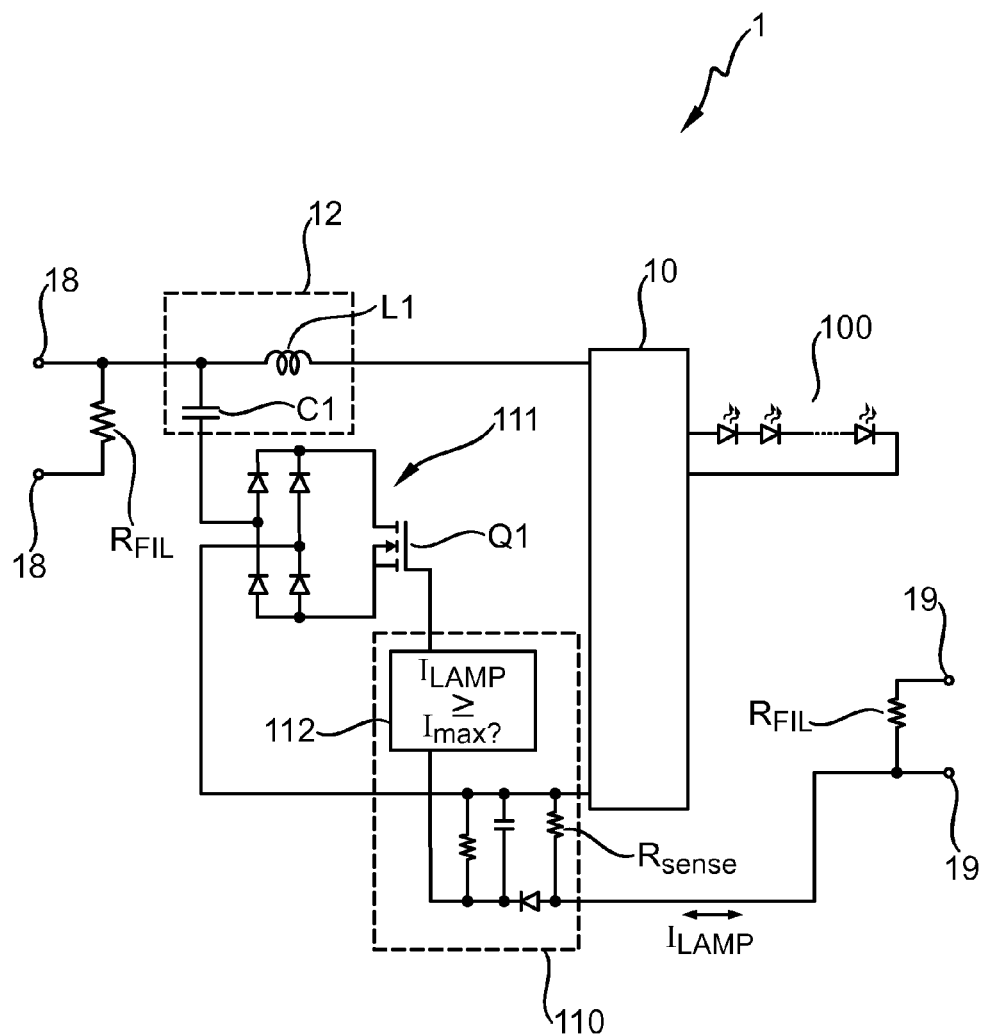
FIG. 9 shows a second embodiment of an LED tube lamp according to the invention.

FIG. 9 shows a second embodiment of an LED tube lamp 1 according to the invention. The detuning circuit 12 in this case also comprises the C-L arrangement described above, but it shall be understood that any suitable arrangement of inductors and capacitors can be used to construct the detuning circuit. Here, the switch 111 comprises an AC bidirectional switch 111 realized using a MOSFET and a diode bridge, and is actuated electrically instead of thermally. In this exemplary embodiment, a current detection circuit of the configuring circuit 110 senses the lamp current $I_{LAMP}$ via a current-sensing resistor $R_{sense}$. The voltage drop across this resistor $R_{sense}$ is converted to a DC component and subsequently compared to a threshold $I_{max}$ in a comparator module 112 which comprises an isolated output connected to the MOSFET gate terminal. For example, a suitable threshold can be 150% of the target lamp current of a comparable fluorescent tube lamp. If the threshold $I_{max}$ is exceeded, the MOSFET of the AC switch 111 is turned off and latched, thereby switching out the capacitor C1 of the detuning circuit 12 as long as the lamp is being powered by a self-oscillating ballast. In an alternative realization, the AC switch could be constructed using a serial arrangement of two MOSFETs. The latching function can be realized in the comparator module.

Figure 10:
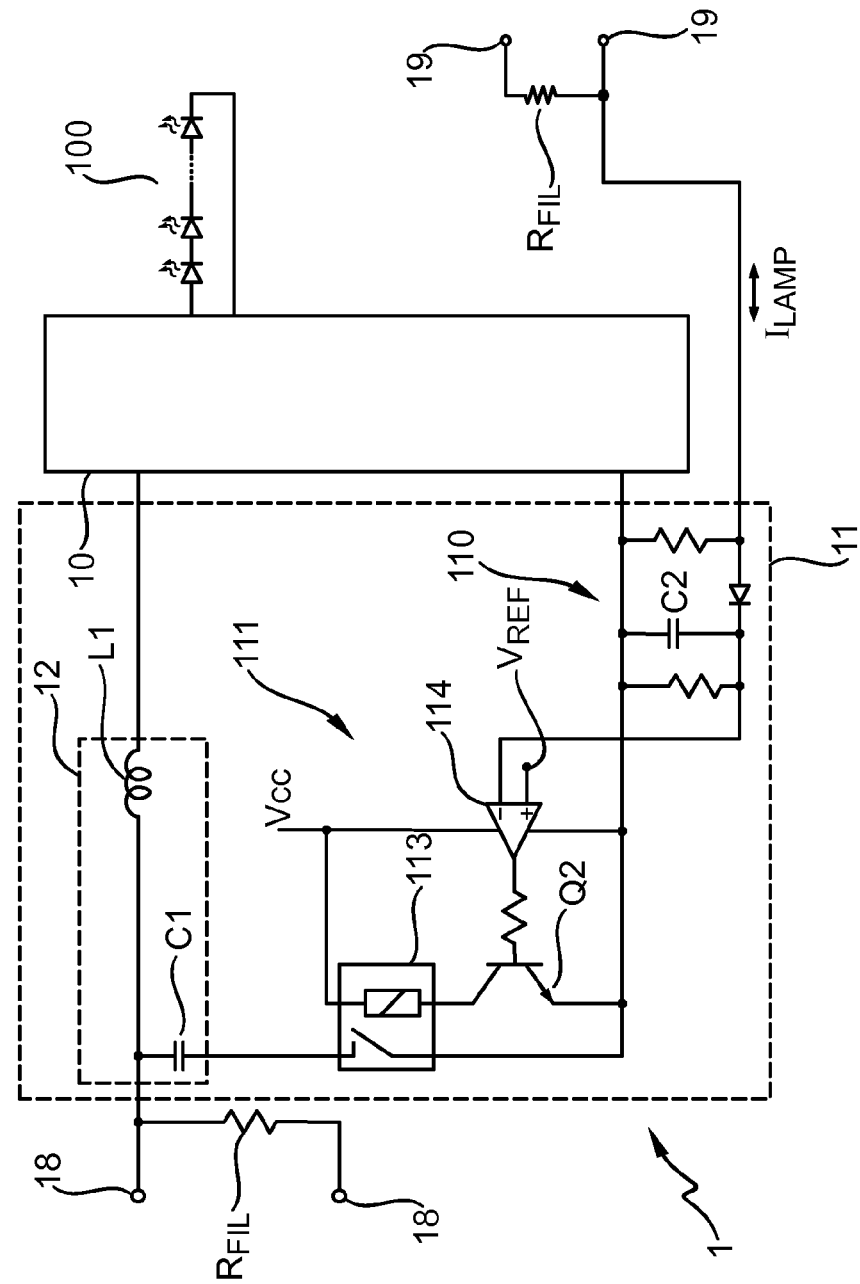
FIG. 10 shows a third embodiment of an LED tube lamp according to the invention.

FIG. 10 shows a third embodiment of an LED tube lamp 1 according to the invention. Here, the detuning arrangement 11 comprises another electrically actuated bidirectional switch 111 realized using a relay 113 and a BJT transistor Q2. An advantage of the relay switch 113 is that it can conduct current in both directions. In this embodiment, a current detection circuit of the configuring circuit 110 senses the lamp current $I_{LAMP}$ via the voltage across the capacitor C2. This voltage is compared to a reference threshold voltage $V_{ref}$ using a comparator circuit 114. When the lamp is powered by a self-oscillating ballast, the lamp current exceeds a threshold $I_{max}$, the voltage across the capacitor C2 will exceed the reference threshold voltage $V_{ref}$, and the output of the comparator 114 will switch the transistor Q2 off, which in turn opens the relay, thereby switching out the capacitor C1 of the detuning circuit 12 as long as the lamp is being powered by a self-oscillating ballast. Here also, the transistor is latched once turned off, in order to keep the switch open as long as the lamp is operational. The comparator circuit 114 can be used to fulfil this latching function.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or "module" does not preclude the use of more than one unit or "module".

The invention claimed is:

1. A detuning arrangement for an LED tube lamp, which detuning arrangement comprises:
    a detuning circuit comprising:
    input connections arranged to receive a lamp current ($I_{LAMP}$);
    output connections arranged to connect the detuning circuit to a driver of the LED tube lamp;
    a series inductor between one of the input connections and one of the output connections;
    a parallel capacitor between the input connections; and
    a configuring circuit in series with the parallel capacitor comprising a current detection circuit realized to detect the lamp current ($I_{LAMP}$) exceeding a predefined threshold ($I_{max}$) and to switch out the parallel capacitor when the lamp current exceeds the predefined threshold ($I_{max}$).

2. A detuning arrangement according to claim 1, wherein the configuring circuit realized to:
    determine the high-frequency switched ballast is the IC-controlled type by detecting that a lamp current reaches a value of close to 100% of a fluorescent tube lamp current; and
    determine the high-frequency switched ballast is the self-oscillating type by detecting that a lamp current reaches the predefined threshold ($I_{max}$) of 150% of the fluorescent tube lamp current.

3. A detuning arrangement according to claim 1, wherein the configuring circuit comprises a switch realized to switch out at least one element of the detuning circuit when the lamp current ($I_{LAMP}$) exceeds the predefined threshold ($I_{max}$).

4. A detuning arrangement according to claim 2, wherein the current detection circuit, comprises a power resistor, and the switch comprises a thermal fuse thermally coupled to the power resistor.

5. A detuning arrangement according to claim 3, wherein the switch comprises a resettable thermal fuse.

6. A detuning arrangement according to claim 3, wherein the switch comprises a PTC resistor.

7. A detuning arrangement according to claim 4, comprising a visible indication of the fuse status.

8. A detuning arrangement according to claim 1, wherein the configuring circuit comprises a bidirectional AC switch, and the current detection circuit comprises a current sensing resistor ($R_{sense}$) for sensing the lamp current ($I_{LAMP}$), and wherein the current detection circuit is realized to open the bidirectional AC switch when the sensed lamp current ($I_{LAMP}$) exceeds a lamp current threshold ($I_{max}$).

9. A detuning arrangement according to claim 1, wherein the configuring circuit comprises a relay, and the current detection circuit is realized to open the relay when the sensed lamp current ($I_{LAMP}$) exceeds a lamp current threshold ($I_{max}$).

10. An LED tube lamp realized for use with a high-frequency switched ballast, which LED tube lamp comprises
an LED arrangement;
a driver realized to drive the LED arrangement;
a detuning arrangement according to claim 1.

11. An LED tube lamp according to claim 10, wherein the detuning circuit is arranged at the input to the driver.

12. An LED tube lamp according to claim 10, realized as a retrofit lamp to replace a linear fluorescent lamp with a tube diameter in the range of 5.0 mm to 50.0 mm or a compact fluorescent lamp, and comprising an essentially tubular housing to accommodate at least the LED arrangement, the driver and the detuning arrangement.

13. A method of operating a detuning arrangement for an LED tube lamp, the method comprising:
detecting a lamp current ($I_{LAMP}$) exceeding a predefined threshold ($I_{max}$);
switching out a parallel capacitor when the lamp current exceeds the predefined threshold ($I_{max}$).

* * * * *